US008670170B2

(12) United States Patent
Chou et al.

(10) Patent No.: US 8,670,170 B2
(45) Date of Patent: Mar. 11, 2014

(54) OPTICAL SCANNING PROJECTION SYSTEM

(75) Inventors: Ming-Chieh Chou, Tainan (TW);
Yao-Hui Lee, Tainan (TW); Han-Wei Su, Tainan (TW); Yu-Jen Wang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 303 days.

(21) Appl. No.: 13/238,139

(22) Filed: Sep. 21, 2011

(65) Prior Publication Data
US 2012/0154882 A1 Jun. 21, 2012

(30) Foreign Application Priority Data

Dec. 17, 2010 (TW) .............................. 99144614 A
Jun. 22, 2011 (TW) ............................. 100121898 A

(51) Int. Cl.
G02B 26/08 (2006.01)
(52) U.S. Cl.
USPC ..................... 359/205.1; 359/201.1; 359/238; 359/200.8; 359/221.3; 250/201.1
(58) Field of Classification Search
USPC ............. 455/140, 159.1, 159.2, 160.1, 181.1, 455/41.3, 154.2; 359/221.3, 205.1, 17, 19, 359/27, 28, 34, 197.1, 198.1, 200.6, 200.7, 359/200.8, 201.1, 202.1, 204.1, 212.1, 238, 359/292, 318; 250/201.1; 385/18, 17, 24
See application file for complete search history.

(56) References Cited

U.S. PATENT DOCUMENTS 5,729,475 A * 3/1998 Romanik, Jr. ................. 702/150
5,920,059 A * 7/1999 Barile et al. ............. 235/462.07
7,106,432 B1 * 9/2006 Mapoles et al. ........... 356/237.2
7,167,288 B2 1/2007 Miyatake et al.
7,497,578 B2 3/2009 Wood
(Continued)

FOREIGN PATENT DOCUMENTS

CN 101561619 A 10/2009
TW I240090 B 9/2005
(Continued)

OTHER PUBLICATIONS

Arda D. Yalcinkaya et al., "Two-Axis Electromagnetic Microscanner for High Resolution Displays", Journal of Microelectromechanical Systems, vol. 15, No. 4, pp. 786-794, Aug. 2006.
(Continued)

Primary Examiner — Tan Trinh
(74) Attorney, Agent, or Firm — Rabin & Berdo, P.C.

(57) ABSTRACT

An optical scanning projection system includes a scanning light source component, a second reflecting element, a transparent element, a scanning element, a photosensitive element and a control module. The transparent element receives a main light beam emitted by the scanning light source component and reflects a part of the main light beam to be a reflected light. The reflected light is reflected by the second reflecting element, and the scanning element reflects the reflected light from the second reflecting element in a scanning manner. The photosensitive element receives the reflected light from the scanning element and outputs a sensing signal, and the control module actuates or stops actuating the scanning light source component according to the sensing signal. Therefore, when the scanning element is damaged, the control module may instantly stop actuating the scanning light source component, thereby enhancing the using safety of the optical scanning projection system.

28 Claims, 9 Drawing Sheets

(56) References Cited

U.S. PATENT DOCUMENTS

| | | | |
|---|---|---|---|
| 7,652,801 B2 * | 1/2010 | Haas et al. | 358/474 |
| 7,838,817 B2 | 11/2010 | Gibson et al. | |
| 7,855,812 B2 * | 12/2010 | Gelsomini et al. | 358/474 |
| 2002/0186918 A1 * | 12/2002 | Burroughs | 385/18 |
| 2009/0231659 A1 * | 9/2009 | Masuda et al. | 359/221.3 |
| 2010/0033691 A1 | 2/2010 | Hung et al. | |
| 2010/0053591 A1 | 3/2010 | Gibson et al. | |
| 2010/0195058 A1 | 8/2010 | Ritz | |

FOREIGN PATENT DOCUMENTS

| | | |
|---|---|---|
| TW | 200907549 A | 2/2009 |
| TW | 201007327 | 2/2010 |
| TW | 201015197 A | 4/2010 |
| TW | 201019032 A | 5/2010 |
| TW | M382506 | 6/2010 |

OTHER PUBLICATIONS

Chang-Hyeon Ji et al. "Electromagnetic Two-Dimensional Scanner Using Radial Magnetic Field", Journal of Microelectromechanical Systems, vol. 16, No. 4 pp. 989-996, Aug. 2007.

Wyatt O. Davis et al., " MEMS-Based Pico Projector Display", pp. 31-32, 2008 IEEE.

Jongbaeg Kim et al.," Monolithic 2-D Scanning Mirror Using Self-Aligned Angular Vertical Comb Drives", IEEE Photonics Technology Letters, vol. 17, No. 11, pp. 2307-2309, Nov. 2005.

Taiwan Patent Office, Office Action, Patent Application Serial No. TW100121898, Oct. 9, 2013, Taiwan.

* cited by examiner

OPTICAL SCANNING PROJECTION SYSTEM

CROSS-REFERENCE TO RELATED APPLICATIONS

This non-provisional application claims priority under 35 U.S.C. §119(a) on Patent Application No. 099144614 filed in Taiwan, R.O.C. on Dec. 17, 2010 and Patent Application No. 100121898 filed in Taiwan, R.O.C. on Jun. 22, 2011, the entire contents of which are hereby incorporated by reference.

BACKGROUND

1. Technical Field

The present disclosure relates to an optical scanning projection system, and more particularly, to an optical scanning projection system for improving safety in use and compensating image distortions.

2. Related Art

Currently, the micro-projection system technique may be classified into two categories. The first category is laser scanning projection technique using laser light as a light source, and the second category is Digital Light Process (DLP) technique or Liquid Crystal on Silicon (LCoS) technique using a Light Emitting Diode (LED) as a light source. As the light source is a LED, there are some problems with the micro-projection system. First, the operating temperature of the micro-projection system may adversely affect the service life and the luminescence efficiency of the LED. Second, the unsatisfactory photoelectric conversion efficiency of the LED leads to that raising the brightness of the micro-projection system is difficult. Moreover, when being turned on for a considerable period, the LED usually causes high power consumption of the system. Accordingly, when LED is used as a light source of the light engine with delicate focus lens set, the structure of the light engine becomes complicated.

With respect to the micro-projection system employing a laser as the light source, because the laser has a wider color gamut and better color saturation, the projected frame is brighter and more colorful. Besides, the laser scanning projection technique merely uses a single micro-mirror to perform the scanning projection to form the projection frame. However, the DLP technique needs many micro-mirrors, which causes difficulties in the yield and cost control. Therefore, comparing with the DLP technique, the laser scanning projection technique has the advantages of better yield and low cost. Furthermore, as the laser light has high brightness, good directivity, and may be projected on any plane, the complicated focus lens set is not required when the laser is used as the light source. Accordingly, the structure of the light engine using LED as the light source is simple, and, therefore, the micro-projection system employing the laser scanning projection technique is small in size and is easy to be built into an electronic device.

Since the laser is a high-power light source, the micro-projection system employing the laser scanning projection technique (hereinafter, referred to as the laser scanning projection system) needs to strictly conform to the laser safety specification. Generally, the laser scanning projection system meets the specification in normal operation. However, when the scanning element (i.e. the micro-mirror) is faulty and, therefore, cannot transform the laser light into the projection frame, a high brightness single light spot which is hazardous to the viewer's eyes will be formed. Moreover, during the laser scanning projection system carrying out the dynamic projection, the content of the projection frames changes quickly. Such quick changes then change the power of the laser light, so that the temperature of the scanning element changes quickly. However, such quick temperature changes influence the amplitude of the scanning element and, therefore, cause the misalignment of the scanning frames played sequentially. As a result, the image distortion and the frame blur are generated. Therefore, it is the trend in research and development for the practitioners in the field on how to solve the safety problem and the frame blur generated in dynamic projection of the laser scanning projection system.

SUMMARY

Accordingly, the present disclosure provides an optical scanning projection system, thereby solving the problems of safety and a frame blur generated in dynamic projection of the laser scanning projection system.

According to the optical scanning projection system in an embodiment of the present disclosure, the optical scanning projection system includes a scanning light source component, a second reflecting element, a transparent element, a scanning element, a photosensitive element and a control module. The scanning light source component may emit a main light beam. The transparent element receives the main light beam and reflects a part of the main light beam to be a reflected light while allowing a part of the main light beam to transmit to become a transmitting light. The second reflecting element reflects the reflected light. The scanning element reflects the transmitting light incident on the scanning element and the reflected light reflected by the second reflecting element in a scanning manner. Then, the photosensitive element receives the reflected light from the scanning element and outputs a sensing signal, and the control module selectively actuates or stops actuating the scanning light source component according to the sensing signal.

In another embodiment, the optical scanning projection system further comprises a scan driving unit. The control module outputs a synchronization signal to the scanning light source component and outputs a reference signal to the scan driving unit. The scan driving unit drives the scanning element by the reference signal. The control module adjusts an output time of the synchronization signal according to a time difference between the sensing signal, the synchronization signal and the reference signal.

In still another embodiment, the optical scanning projection system includes a scanning light source component, a transparent element, a second reflecting element, a scanning element, a photosensitive element and a control module. The scanning light source component emits a main light beam. The transparent element receives the main light beam and reflects a part of the main light beam to be a reflected light. The second reflecting element reflects the reflected light. The scanning element reflects the reflected light reflected by the second reflecting element in a scanning manner to obtain a detection frame, which includes a detection line, and a light intensity of the detection line does not change with time. The photosensitive element is used to sense the detection line and output a sensing signal. The control module selectively actuates or stops actuating the scanning light source component according to the sensing signal.

According to the optical scanning projection system of another embodiment of the present disclosure, the optical scanning projection system includes a scanning light source component, a detection light source, a laser driving unit, a first reflecting element, a second reflecting element, a scanning element, a photosensitive element and a control module. The scanning light source component and the detection light source respectively emit a main light beam and a detection light beam. The first reflecting element receives and reflects the main light beam to the scanning element. The second reflecting element receives and reflects the detection light beam to the scanning element. The scanning element reflects the main light beam from the first reflecting element and the detection light beam from the second reflecting element in a scanning manner. The photosensitive element receives the detection light beam from scanning element and outputs a sensing signal to the control module. The control module selectively actuates or stops actuating the scanning light source component according to the sensing signal. The laser driving unit is used to continuously drive the detection light source to emit the detection light beam.

The optical scanning projection system of the present disclosure adopts the configuration of the transparent element and scanning element or the arrangement of the detection light source, so that when the scanning element is faulty and cannot operate, the control module may instantly stop actuating the scanning light source component to avoid the single bright spot on the image projected by the optical scanning projection system generated by the failure of the scanning element and avoid causing harm to viewers' eyes. Moreover, the control module adjusts the synchronization signal according to a relation of the synchronization signal, the reference signal and the sensing signal, which may compensate the blur image generated by the scanning element due to the change of the amplitude. Furthermore, in order to avoid that the photosensitive element cannot output the corresponding sensing signal clearly due to the insufficient light intensity of the detection frame and the control module cannot determine if the scanning element operates normally, the configuration of the position of the photosensitive element or the arrangement of the detection light source, the photosensitive element sensing the detection line or the detection frame may be guaranteed to accurately output the corresponding sensing signal based on the characteristic that the light intensity of the detection line does not change with time.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1A:
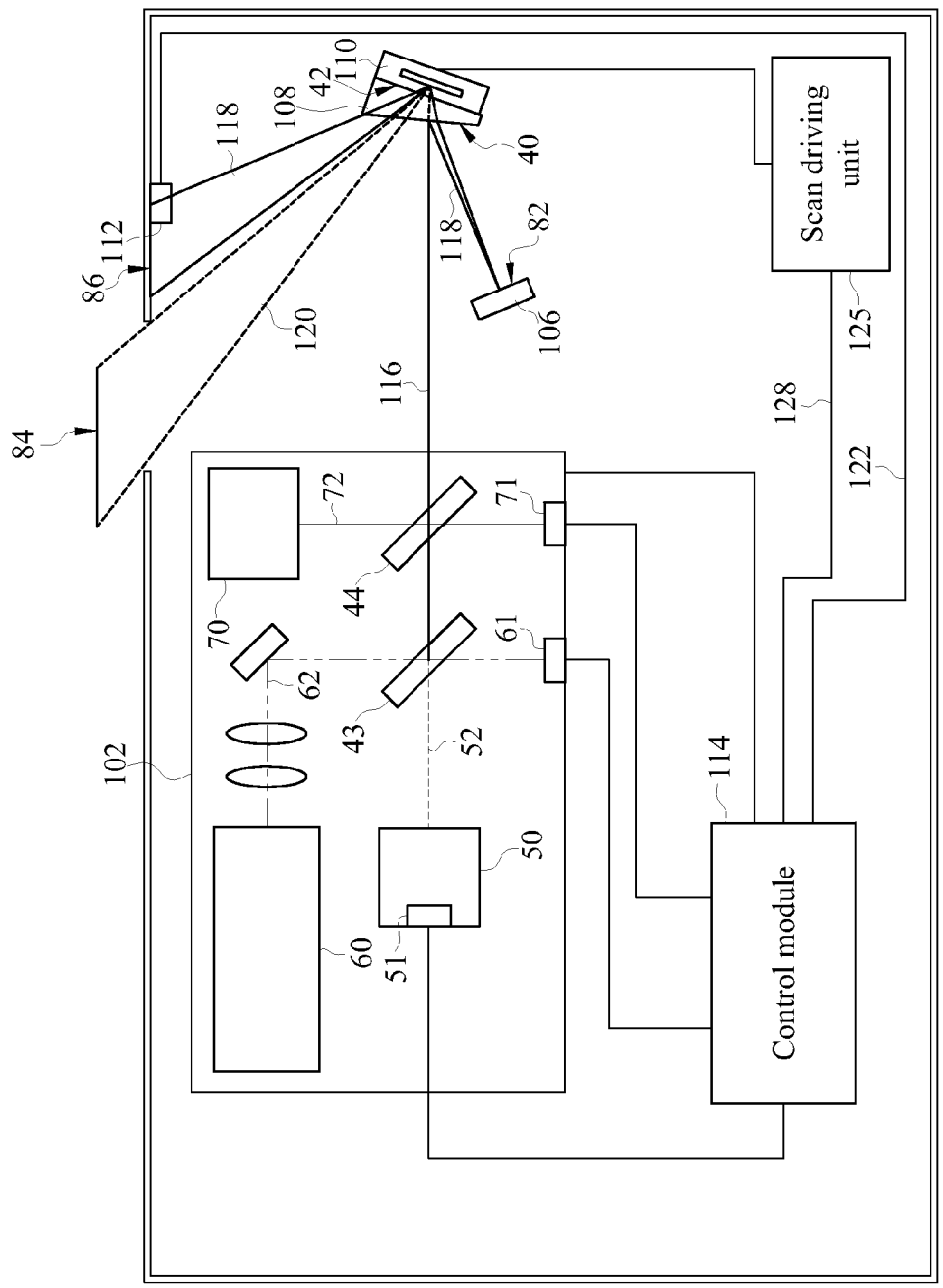
FIG. 1A is a schematic architectural view of an optical scanning projection system according to a first embodiment of the present disclosure.
Figure 1B:
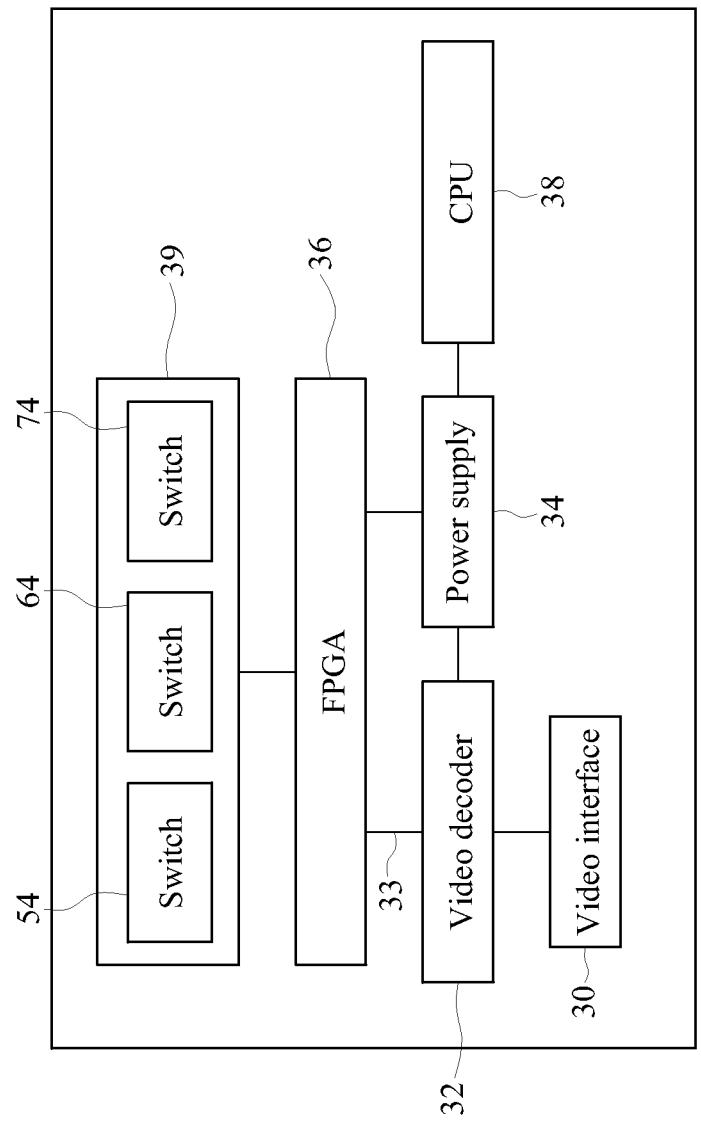
FIG. 1B is a schematic block diagram of a circuit of a control module of FIG. 1A.

FIG. 1A is a schematic architectural view of an optical scanning projection system according to a first embodiment of the present disclosure and FIG. 1B is a schematic block diagram of the circuit of the control module of FIG. 1A. Referring to FIG. 1A and FIG. 1B, the optical scanning projection system 100 is applicable to a mobile projection device, for example but not limited to, a mobile phone or a personal digital assistant (PDA). The optical scanning projection system 100 may include, but not limited to, a scanning light source component 102, a second reflecting element 106, a transparent element 108, a scanning element 110, a photosensitive element 112 and a control module 114. The second reflecting element 106 includes a second reflecting surface 82, which may be, but is not limited to, a metal layer or a coated reflective layer. The scanning element 110 may be, but is not limited to, a scanning mirror, and the photosensitive element 112 may be, but is not limited to, a photodetector (PD). The transparent element 108 may be, but is not limited to, glass and may be used for packaging of the scanning element 110. The transparent element 108 is disposed on the scanning element 110 and is in contact with the scanning element 110. An angle formed between a surface 40 of the transparent element 108 and a surface 42 of the scanning element 110 may be, but is not limited to, 8°. That is to say, the angle formed between the surface 40 of the transparent element 108 and the surface 42 of the scanning element 110 may be any degree. However, the angle must enable the second reflecting element 106 to receive the reflected light 118 reflected by the transparent element 108 without shielding the projection frame 84.

In this embodiment, the scanning light source component 102 may include, but not limited to, a light source 50, a light source 60, a light source 70, a photometer 51, a photometer 61, a photometer 71, a light splitter 43 and a light splitter 44. The light source 50 may emit a red light beam 52, the light source 60 may emit a green light beam 62, and the light source 70 may emit a blue light beam 72. The light source 50, the light source 60 and the light source 70 may be, but are not limited to, semiconductor lasers. In other words, the light source 50, the light source 60 and the light source 70 may also be solid-state lasers. A part of the red light beam 52 may be incident on the photometer 51 built in the light source 50, and the rest part of the red light beam 52 may be transmitted through the light splitter 43 and the light splitter 44. When the green light beam 62 is incident on the light splitter 43, five percent of the green light beam 62 may be, but is not limited to, transmitted through the light splitter 43 and incident on the photometer 61. Ninety-five percent of the green light beam 62 may be, but is not limited to, reflected by the light splitter 43 and transmitted through the light splitter 44. When the blue light beam 72 is incident on the light splitter 44, five percent of the blue light beam 72 may be, but is not limited to, transmitted through the light splitter 44 and incident on the photometer 71. Ninety-five percent of the blue light beam 72 may be, but is not limited to, reflected by the light splitter 44. Therefore, the photometer 51, the photometer 61 and the photometer 71 are used to respectively detect if the light source 50, the light source 60 and the light source 70 respectively emit the red light beam 52, the green light beam 62 and the blue light beam 52, but this embodiment is not intended to limit the scope of the present disclosure.

The control module 114 may include, but not limited to, a video interface 30, a video decoder 32, a power supply 34, a Field-Programmable Gate Array (FPGA) 36, a Central Processing Unit (CPU) 38 and a light source driver 39. The light source driver 39 includes, but not limited to, a switch 54, a switch 64 and a switch 74. The switch 54 is used for actuating the light source 50, the switch 64 is used for actuating the light source 60, and the switch 74 is used for actuating the light source 70. The FPGA 36 is used to control the switch 54, the switch 64 and the switch 74, and to determine if the light source 50, the light source 60 and the light source 70 are damaged according to the result that the photometer 51, the photometer 61 and the photometer 71 detect the light source 50, the light source 60 and the light source 70. The FPGA 36 is also used to monitor the output power through the detect results, thereby compensating image white balances, but this embodiment is not intended to limit the scope of the present disclosure.

When the power supply 34 is turned on, the CPU 38 accesses all parameters of the control module 114. Then, the video interface 30 receives a data signal (not marked) and transfers the data signal to the video decoder 32. The video decoder 32 decodes the data signal into the decoded signal 33 and then transfers the decoded signal 33 to the FPGA 36, which converts the decoded signal 33 to grayscale and transfers the converted signal to the light source driver 39. The light source driver 39 drives at least one of the switch 54, the switch 64 and the switch 74 according to the decoded signal 33 converted to grayscale and, therefore, correspondingly actuates the light source 50, the light source 60 and the light source 70, but this embodiment is not intended to limit the scope of the present disclosure.

The scanning light source component 102 may emit a main light beam 116. In this embodiment, the main light beam 116 may include a red light beam 52, a green light beam 62 and a blue light beam 72, but this embodiment is not intended to limit the scope of the present disclosure. Then, the transparent element 108 (i.e. the glass) receives the main light beam 116 and reflects a part of the main light beam 116, while allowing a part of the main light beam 116 to transmit. The part of the main light beam 116 reflected is hereinafter referred to as reflected light 118, and the part of the main light beam 116 transmitting the transparent element 108 is referred to as transmitting light 120. In this embodiment, the reflected light 118 equals to five percent of the main light beam 116, and the transmitting light 120 equals to ninety-five percent of the main light beam 116, but this embodiment is not intended to limit the percentages of the reflected light 118 and the transmitting light 118.

The second reflecting element 106 reflects the reflected light 118, and the scanning element 110 (i.e. the scanning mirror) reflects both the transmitting light 120 incident on the scanning element 110 and the reflected light 116 reflected by the second reflecting element 106 in a scanning manner to respectively obtain a projection frame 84 and a detection frame 86. In other words, the transmitting light 120 generated after the main light beam 116 passes through the transparent element 108 is reflected by the scanning element 110 in a scanning manner to obtain the projection frame 84. The reflected light 118 generated after the main light beam 116 passes through the transparent element 108 firstly is reflected by the second reflecting element 106 and then is reflected by the scanning element 110 in a scanning manner to obtain the detection frame 86.

In the above scanning manner, by controlling the direction and the amplitude of the scanning element 110, the incident light source (i.e. the transmitting light 120 incident on the scanning element 110 and the reflected light 116 reflected by the second reflecting element 106) is reflected to form the projection frame 84 and the detection frame 86. The amplitude of the scanning element 110 relates to the energy of the incident light source. However, when the scanning element 110 operates normally, the amplitude of the scanning element 110 is controlled in a predetermined range. In this embodiment, the predetermined range may be, but is not limited to, ±90°.

Figure 2A:
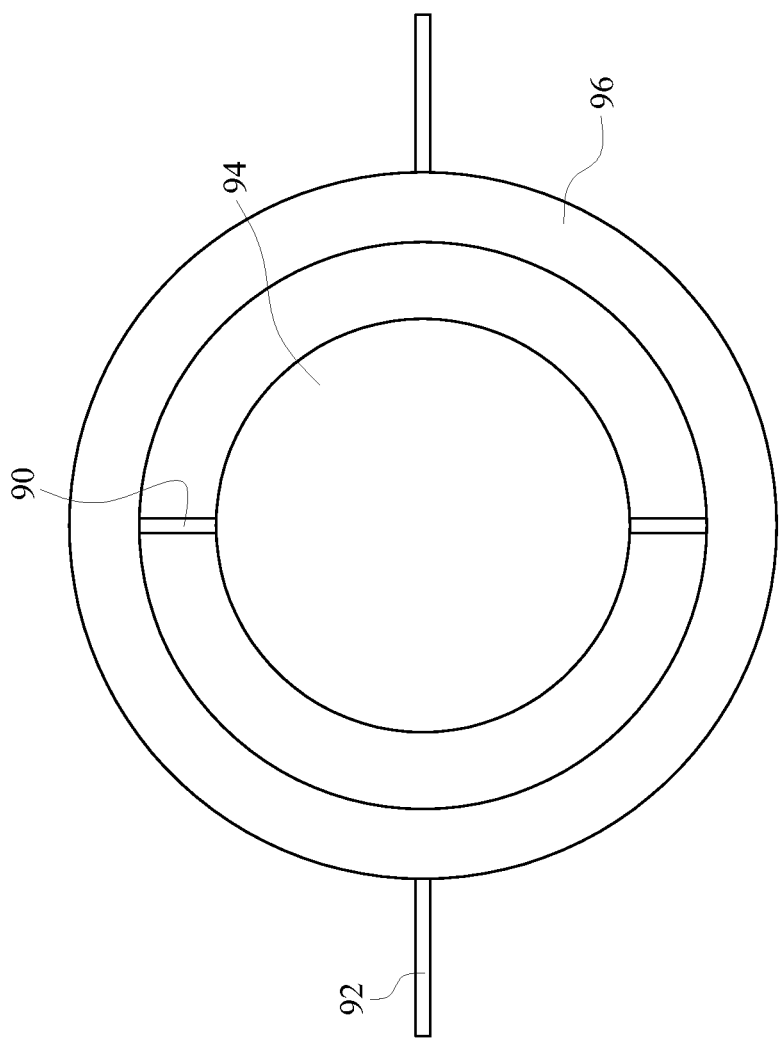
FIG. 2A is a schematic structural view of a scanning element of FIG. 1A.
Figure 2B:
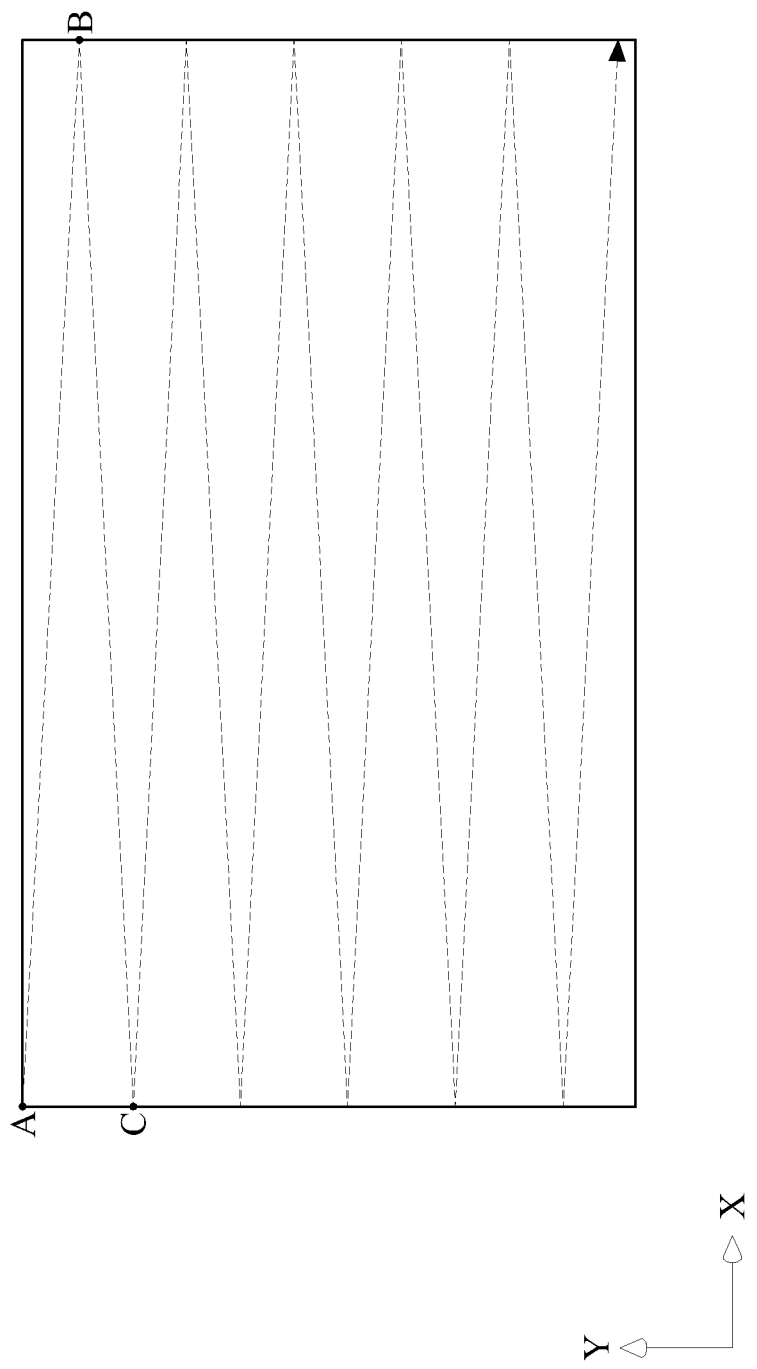
FIG. 2B is a schematic view of a scanning path of the scanning element of FIG. 1A.

Referring to FIG. 2A and FIG. 2B, FIG. 2A is a schematic structural view of the scanning element in FIG. 1A and FIG. 2B is a schematic view of a scanning path of the scanning element in FIG. 1A. The scanning element 110 may include a fast shaft 90, a slow shaft 92, a mirror 94 and an outer ring 96. The fast shaft 90 is responsible for a horizontal direction X of the scanning path and the slow shaft 92 is responsible for a vertical direction Y of the scanning path. The mirror 94 is a reflecting surface of the scanning element 110. The outer ring 96 is an outer frame of the mirror 94. When the scanning element 110 is scanning, the mirror 94 reflects an incident light source 99 incident on the scanning element 110, and the fast shaft 90 and the slow shaft 92 control the scanning path of the reflected light. In this embodiment, according to FIG. 2B, the scanning path starts from a scan point A to a scan point B, and then from the scan point B to a scan point C. Then, it is deduced in this manner to finish the first scanning (not marked), and the second scanning (not marked) moves in a reverse direction the scanning path of the first scanning, that is, starts from the scan point C to the scan point B and then from the scan point B to the scan point A. The following scanning paths may be deduced in this manner and will not be described in details. The scanning element 110 may produce thirty to sixty sheets of images (i.e. thirty to sixty times of scanning) every second, but this embodiment is not intended to limit the scope of the present disclosure.

Referring to FIG. 1A and FIG. 1B, the photosensitive element 112 (i.e. the PD) receives the reflected light 118 from the scanning element 110 and outputs a sensing signal 122. The control module 114 actuates or stops actuating the scanning light source component 102 according to the sensing signal 122. In other words, the photosensitive element 112 (i.e. the PD) is configured in the detection frame 86 to receive the reflected light 118 from the scanning element 110 and outputs the sensing signal 122. When the photosensitive element 112 cannot receive the reflected light 118 from the scanning element 110, the control module 114 stops actuating the scanning light source component 102 according to the sensing signal 122 (that is, the FPGA 36 turns off the switch 54, the switch 64 and the switch 74 according to the sensing signal 122, in which the switch 54, the switch 64 and the switch 74 respectively are responsible for actuating the light source 50 capable of emitting the red light beam 52, the light source 60 capable of emitting the green light beam 62 and the light source 70 capable of emitting the blue light beam 72).

Figure 3A:
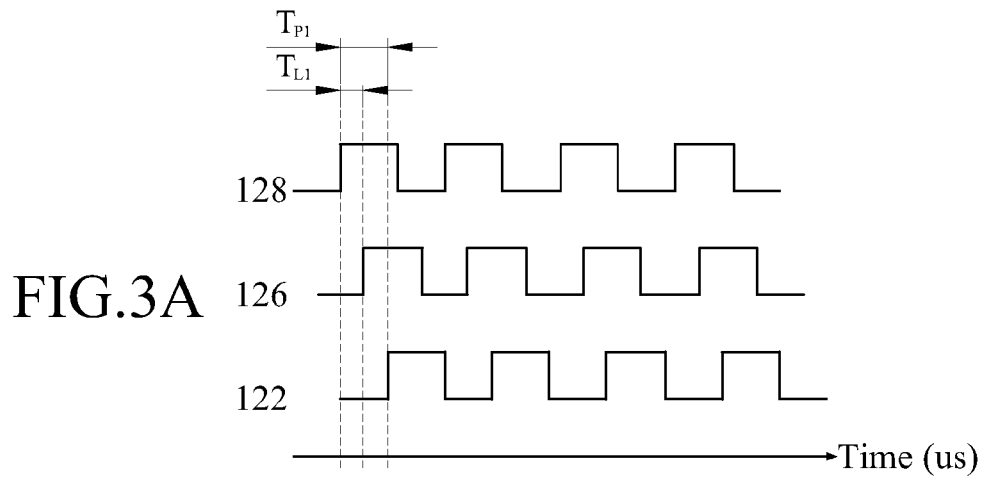
FIG. 3A is a schematic view of a time sequence of a synchronization signal, a reference signal and a sensing signal received and transferred by a compensation module when the scanning element of FIG. 1A operates normally.
Figure 3B:
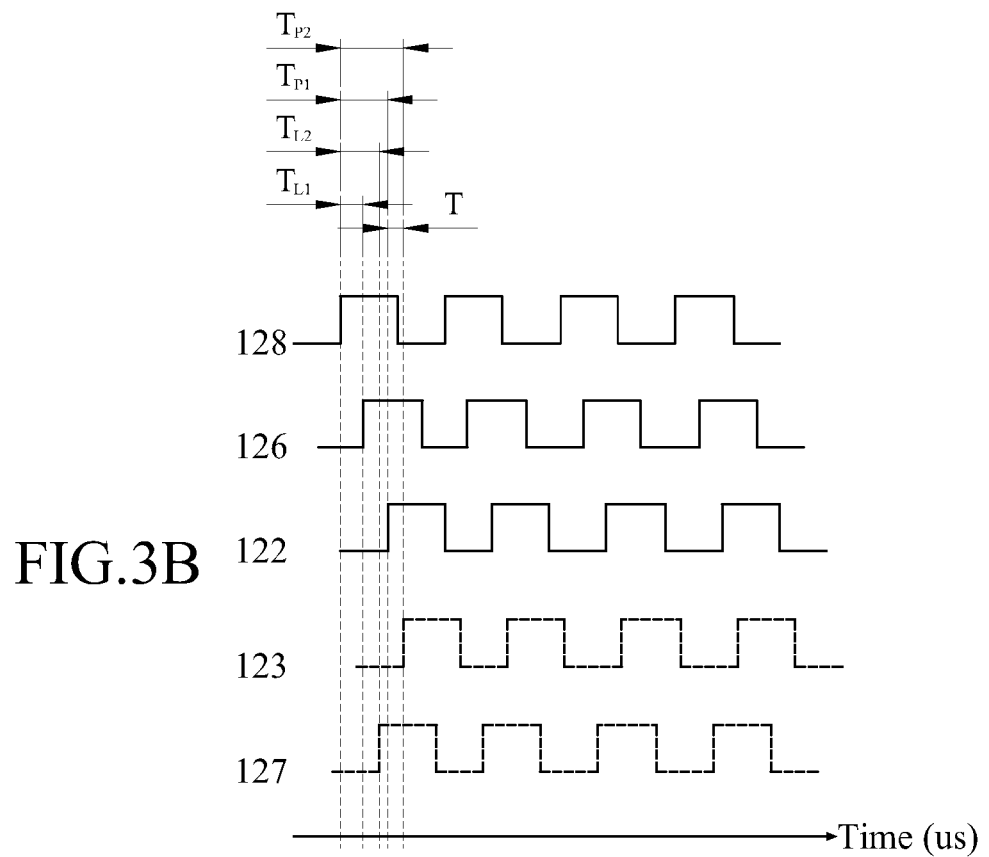
FIG. 3B is a schematic view of a time sequence of a synchronization signal, a reference signal and a sensing signal received and transferred by a compensation module when the scanning element of FIG. 1A operates normally and a compensation signal and a distorted signal received and transferred by a compensation module when the scanning element of FIG. 1A does not operates normally.

FIG. 3A and FIG. 3B respectively are schematic views of a time sequence of a synchronization signal, a reference signal and a sensing signal received and transferred by the control module in FIG. 1A when the scanning element operates normally and abnormally. In this embodiment, the optical scanning projection system 100 may further include a scan driving unit 125. The control module 114 controls the scan driving unit 125 by a reference signal 128, and the scan driving unit 125 drives the scanning element 110 by the reference signal 128. The control module 114 controls the scanning light source component 102 by the synchronization signal 126 (referring to FIG. 3A and FIG. 3B) and may adjust an output time of the synchronization signal 126 according to the time differences between the sensing signal 122, the synchronization signal 126 and the reference signal 128.

In more details, before the shipment of the optical scanning projection system 100, a fixed time difference $T_{L1}$ (i.e. the time difference between a rising edge of the synchronization signal 126 and a rising edge of the reference signal 128) normally exists between the synchronization signal 126 and the reference signal 128 so that the time of the transmitting light 120 incident on the scanning element 110 is synchronized with an operation time of the scanning element 110 to make the image clearer. Therefore, before the shipment, parameters of the synchronization signal 126 are set in the control module 114 (or in the memory and then read by the control module) to make the optical scanning projection system 100 obtain the clear image when operating normally.

Furthermore, after the optical scanning projection system 100 is shipped, when the optical scanning projection system 100 operates normally, the control module 114 takes the rising edge of the reference signal 128 as a reference point; the time difference between the rising edge of the sensing signal 122 and the reference point (i.e. the rising edge of the reference signal 128) is $T_{P1}$ microseconds (µs), and the time difference between the rising edge of the synchronization signal 126 and the reference point (i.e. the rising edge of the reference signal 128) is $T_{L1}$ µs. $T_{P1}-T_{L1}$ is a fixed value. When the optical scanning projection system 100 operates abnormally, for example but not limited to, the variation of the energy of the transmitting light 120 applied on the mirror 94 (as shown in FIG. 3A) is too large, the amplitude of the scanning element 110 is affected to be deviated from the predetermined range, causing the misalignment of the scanning path of the scanning element 110 (for example but not limited to the changes of the first scanning path and the second scanning path) and further causing the blur of the projection frame 84. Here, the time difference between the distorted signal 123 (i.e. the sensing signal received by the control module 114 when the projection frame 84 is blur) and the sensing signal 122 originally received by the control module 114 when the optical scanning projection system 100 operates normally is T µs (i.e. $T_{P2}-T_{P1}$, where $T_{P2}$ is the time difference between the rising edge of the distorted signal 123 and the rising edge of the reference signal 128).

To make the projection frame 84 clear, the control module 114 delays the time of the rising edge of the synchronization signal 126 of T µs (i.e. $T_{L2}-T_{L1}$, where $T_{L2}$ is the time difference between the rising edge of the compensation signal 127 and the rising edge of the reference signal 128) so that the time difference between the compensation signal 127 and the distorted signal 123 is identical to the original time difference between the synchronization signal 126 and the sensing signal 122 obtained when the optical scanning projection system 100 operates normally. Thus, the projection frame 84 becomes clear, but this embodiment is not intended to limit the scope of the present disclosure. The rising edge refers to a portion of a signal raised from a low level to a high level.

Figure 4:
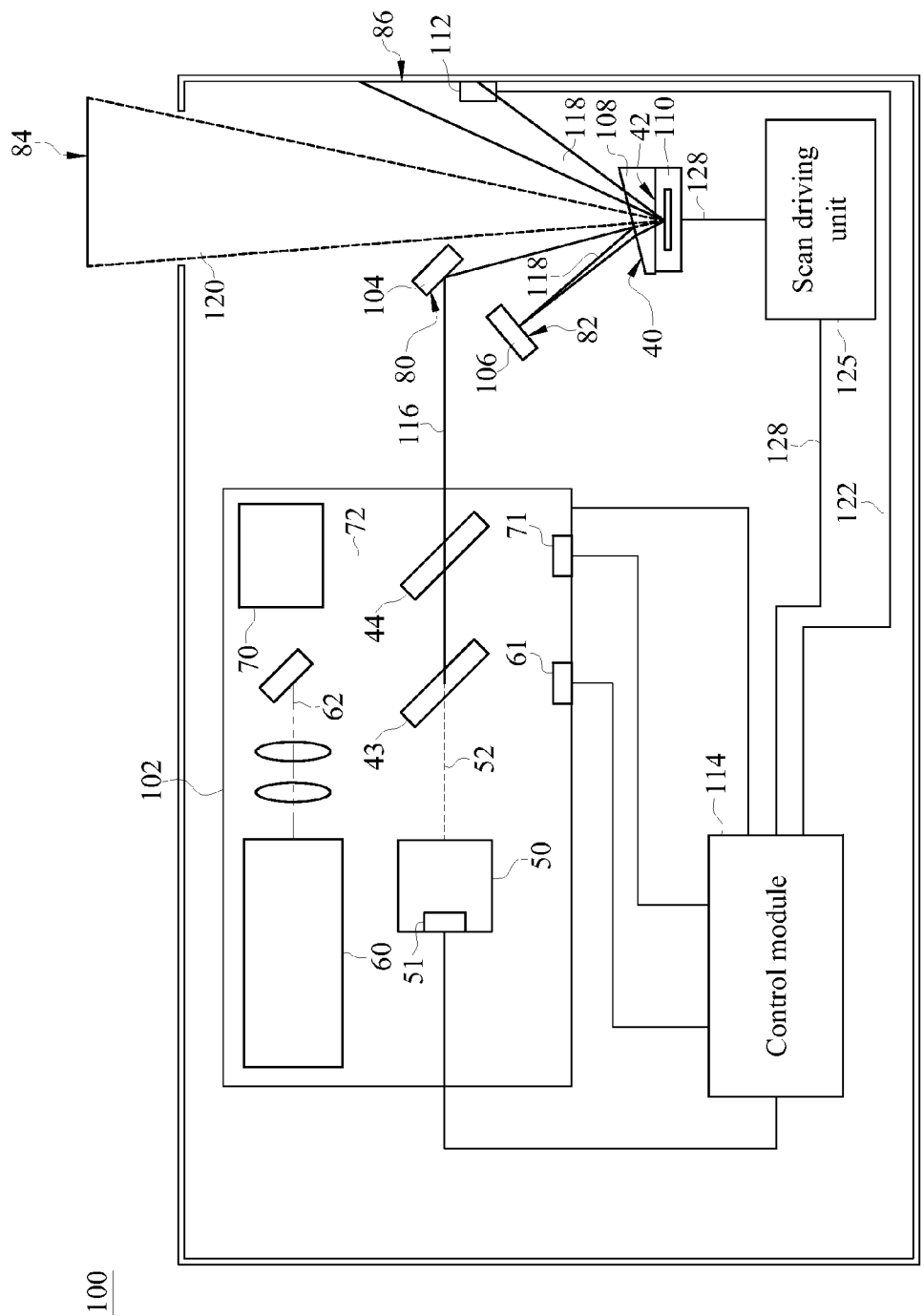
FIG. 4 is a schematic architectural view of an optical scanning projection system according to a second embodiment of the present disclosure.

Furthermore, FIG. 4 is a schematic architectural view of an optical scanning projection system according to a second embodiment of the present disclosure. The optical scanning projection system 100 may further include a first reflecting element 104, which is configured between the scanning light source component 102 and the transparent element 108 and is used to change the path of the main light beam 116 incident on the transparent element 108. The first reflecting element 104 may include a first reflecting surface 80, which may be, but is not limited to, a metal layer or a coated reflective layer. The details of the operation of the optical scanning projection system 100 of this embodiment will not be repeated herein again.

Figure 5:
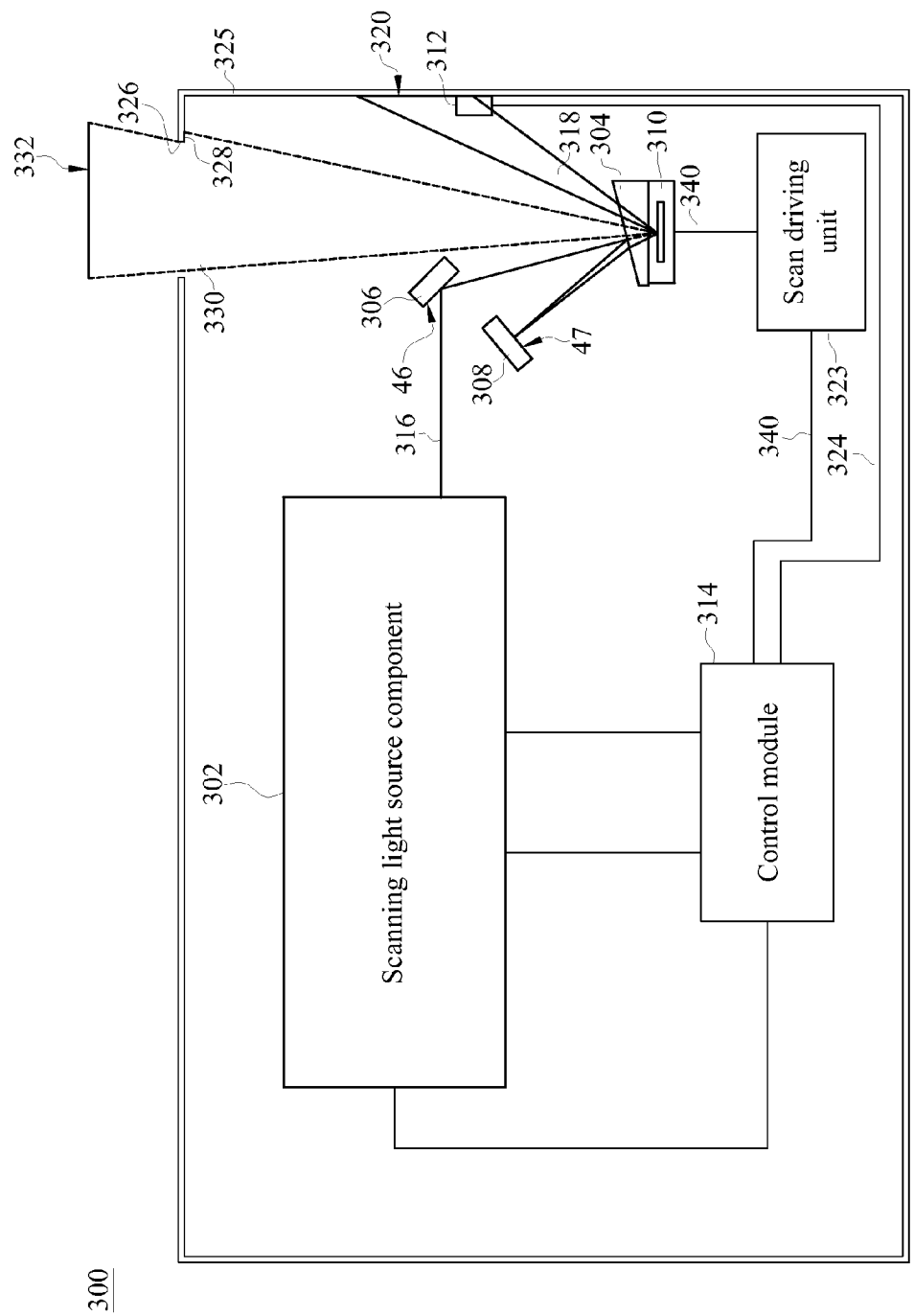
FIG. 5 is a schematic architectural view of an optical scanning projection system according to a third embodiment of the present disclosure.
Figure 6B:
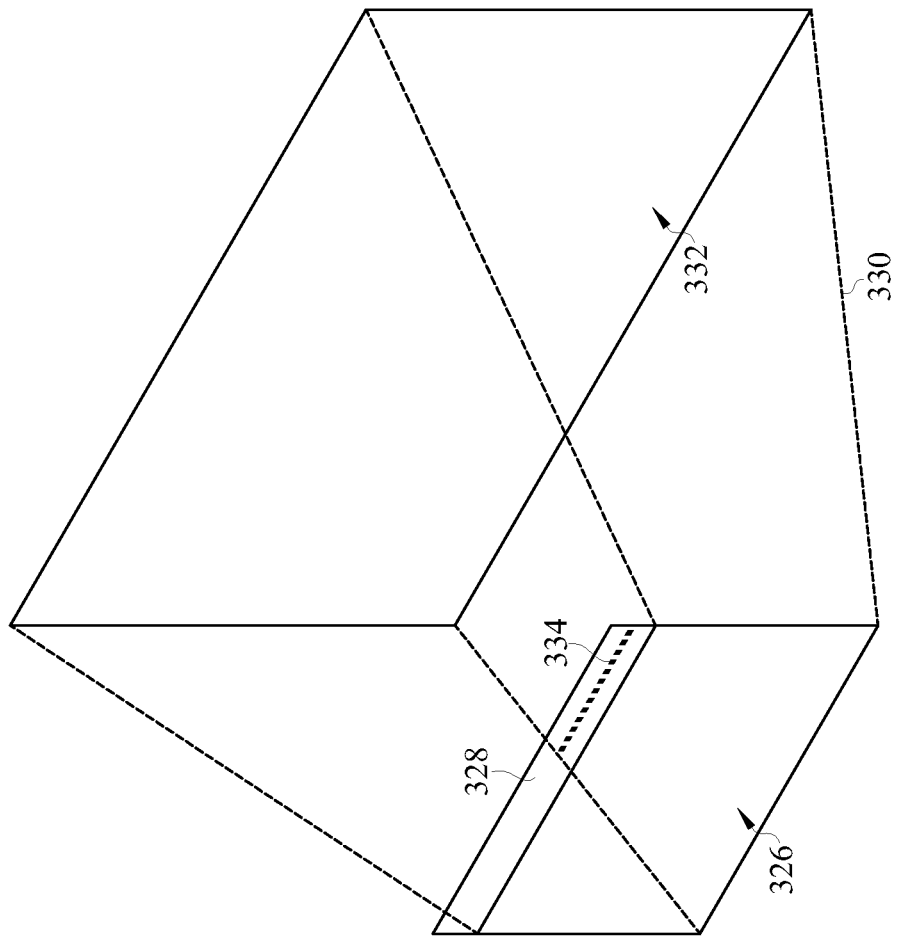
FIG. 6B is a schematic view of a projection frame, a light exit aperture and a test area of FIG. 5.
Figure 6A:
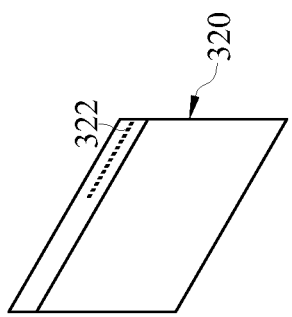
FIG. 6A is a schematic view of a detection frame of FIG. 5.

FIG. 5 is a schematic architectural view of an optical scanning projection system according to a third embodiment of the present disclosure. FIG. 6A is a schematic view of a detection frame of FIG. 5, and FIG. 6B is a schematic view of a projection frame, a light exit aperture and a test area of FIG. 5. The optical scanning projection system 300 may include, but not limited to, a scanning light source component 302, a transparent element 304, a first reflecting element 306, a second reflecting element 308, a scanning element 310, a photosensitive element 312 and a control module 314. The first reflecting element 306 may include a first reflecting surface 46, which may be, but is not limited to, a metal layer or a coated reflective layer. The second reflecting element 308 includes a second reflecting surface 47, which may be, but is not limited to, a metal layer or a coated reflective layer. The transparent element 304 may be, but is not limited to, glass and may be a protection cover of the scanning element 310, and the transparent element 304 is configured on the scanning element 310. The scanning element 310 may be, but is not limited to, a scanning mirror, and the photosensitive element 312 may be, but is not limited to, a PD.

The scanning light source component 302 emits a main light beam 316. The first reflecting element 306 receives and reflects the main light beam 316, and the transparent element 304 receives the main light beam 316 from the first reflecting element 306 and reflects a part of the main light beam 316. Such reflected part of the main light beam 316 is called a reflected light 318 which is, but not limited to, five percent of the main light beam 316, but this embodiment is not intended to limit the scope of the present disclosure. The second reflecting element 308 reflects the reflected light 318, and the scanning element 310 reflects the reflected light 318 reflected by the second reflecting element 308 in a scanning manner to obtain a detection frame 320. The detection frame 320 includes a detection line 322. The light intensity of the detection line 322 does not change with time. In other words, the light intensity of the detection line 322 remains constant when the detection frame 320 changes. The photosensitive element 312 is used to sense the detection line 322 and outputs a sensing signal 324. The control module 314 actuates or stops actuating the scanning light source component 302 according to the sensing signal 324.

In this embodiment, the optical scanning projection system 300 may further include a housing 325, which includes a light exit aperture 326 and a test area 328. The test area 328 may be configured, but not limited to, on the light exit aperture 326. The transparent element 304 allows a part of the main light beam 316 to transmit. Such transmitting part of the main light beam 316 is referred to as a transmitting light 330 hereinafter which is incident on the scanning element 310. The scanning element 310 reflects the transmitting light 330 in a scanning manner. The transmitting light 330 equals, but is not limited to, ninety-five percent of the main light beam 316. However, this embodiment is not intended to limit the scope of the present disclosure. A part of the transmitting light 330 reflected by the scanning element 310 passes through the light exit aperture 326 to form a projection frame 332. A part of the transmitting light 330 reflected by the scanning element 310 is blocked by the test area 328 and cannot form the projection frame 332. The test area 328 includes a test line 334, which corresponds to the detection line 322.

In this embodiment, the optical scanning projection system 300 may further include a scan driving unit 323. The control module 314 controls the scan driving unit 323 by the reference signal 340, and the scan driving unit 323 drives the scanning element 310 by the reference signal 340. The control module 314 outputs a synchronization signal to control the scanning light source component 302. Besides the control module 314 adjusts the output time of the synchronization signal according to the time difference between the sensing signal 324, the synchronization signal and the reference signal 340. Here, the details of the control module 314 adjusting the synchronization signal will not be described herein again.

Figure 7:
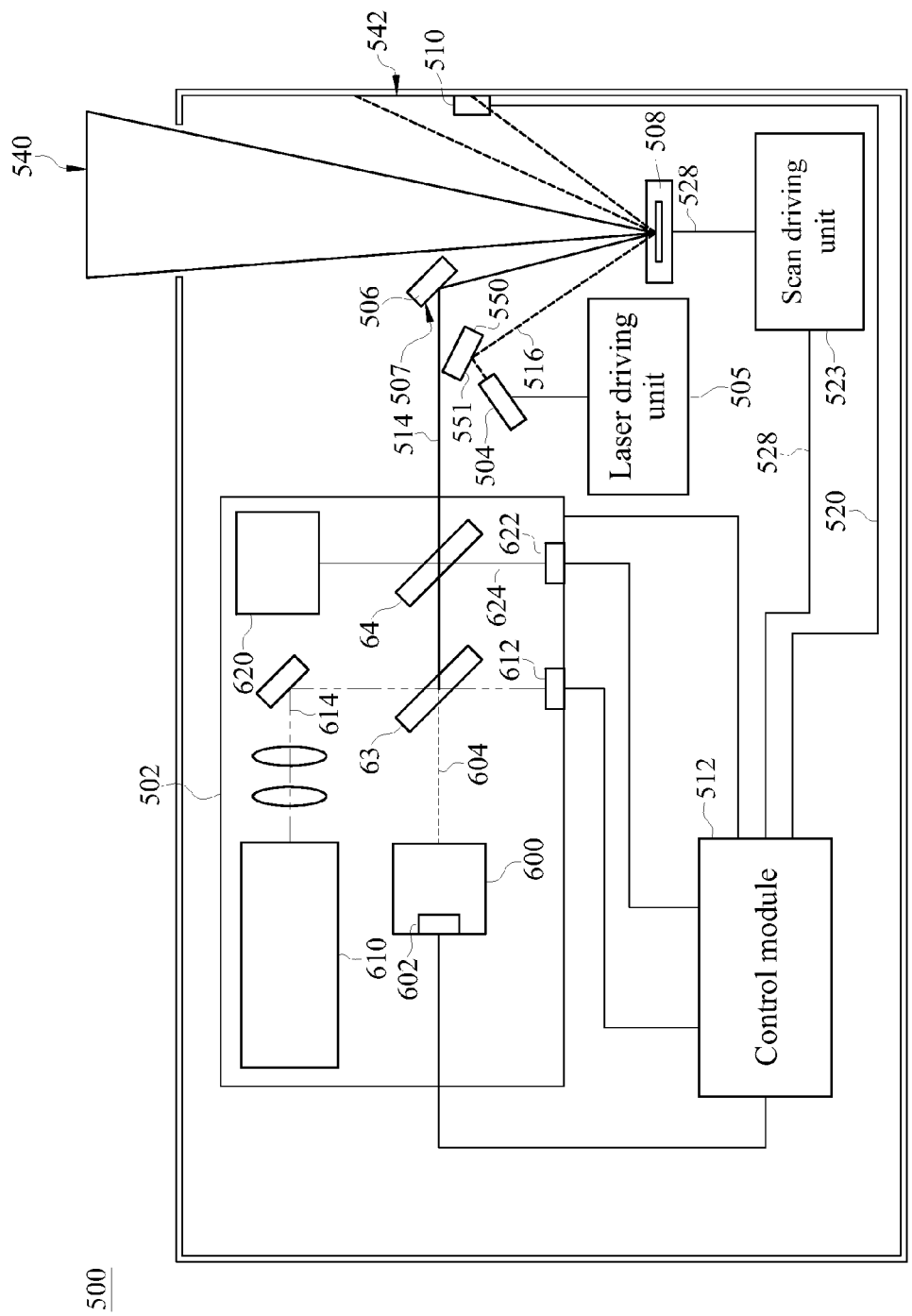
FIG. 7 is a schematic architectural view of an optical scanning projection system according to a fourth embodiment of the present disclosure.

FIG. 7 is a schematic architectural view of an optical scanning projection system according to a fourth embodiment of the present disclosure. The optical scanning projection system 500 includes a scanning light source component 502, a detection light source 504, a laser driving unit 505, a first reflecting element 506, a second reflecting element 550, a scanning element 508, a photosensitive element 510 and a control module 512. The detection light source 504 may be, but is not limited to, a semiconductor laser or a solid-state laser. The first reflecting element 506 may include a first reflecting surface 507, which may be, but is not limited to, a metal layer. The second reflecting element 550 may include a second reflecting surface 551, which may be, but is not limited to, a coated reflective layer. The scanning element 508 may be, but is not limited to, a scanning mirror, and the photosensitive element 510 may be, but is not limited to, a PD.

In this embodiment, the scanning light source component 502 may include, but not limited to, a light source 600, a light source 610, a light source 620, a photometer 602, a photometer 612 and a photometer 622. The light source 600 may emit a red light beam 604; the light source 610 may emit a green light beam 614, and the light source 620 may emit a blue light beam 624. The light source 600, the light source 610 and the light source 620 may be, but are not limited to, semiconductor lasers. The photometer 602, the photometer 612 and the photometer 622 are used to respectively detect if the light source 600, the light source 610 and the light source 620 respectively emit the red light beam 604, the green light beam 614 and the blue light beam 624. The photometer 602 may be built in the light source 600, and the control module 612 may determine if the light source 600, the light source 610 and the light source 620 are damaged according to the detection results of the light source 600, the light source 610 and the light source 620 made by the photometer 602, the photometer 612 and the photometer 622, but this embodiment is not intended to limit the scope of the present disclosure.

The scanning light source component 502 may emit a main light beam 514, and the detection light source 504 may emit a detection light beam 516. In this embodiment, the main light beam 514 may include the red light beam 604, the green light beam 614 and the blue light beam 624. The detection light beam 516 may be, but is not limited to, red light, but this embodiment is not intended to limit the scope of the present disclosure. It should be noted that the laser driving unit 505 continuously drives the detection light source 504 to emit the detection light beam 516.

The first reflecting element 506 receives and reflects the main light beam 514; the second reflecting element 550 receives and reflects the detection light beam 516, and the scanning element 508 reflects both the main light beam 514 from the first reflecting element 506 and the detection light beam 516 from the second reflecting element 550 in a scanning manner to respectively generate a projection frame 540 and a detection frame 542. In other words, the main light beam 514 is reflected by the first reflecting element 506 to the scanning element 508, and then is reflected by the scanning element 508 in a scanning manner to form the projection frame 540. The detection light beam 516 is reflected by the second reflecting element 550 to the scanning element 508 and then is reflected by the scanning element 508 in a scanning manner to form the detection frame 542.

With respect to the scanning manner, the direction and amplitude of the scanning element 508 are controlled to reflect the incident light source (i.e. the main light beam 514 incident on the scanning element 508 and the detection light beam 516) to form the projection frame 540 and the detection frame 542. The amplitude of the scanning element 508 relates to the energy of the incident light source, but when the scanning element 508 operates normally, the amplitude of the scanning element 508 is controlled in a predetermined range. In this embodiment, the predetermined range may be, but is not limited to, ±90°. The details of the scanning manner will not be described herein again.

The photosensitive element 510 receives the detection light beam 516 from the scanning element 508 and outputs a sensing signal 520. The control module 512 actuates or stops actuating the scanning light source component 502 according to the sensing signal 520. When the photosensitive element 510 cannot receive the detection light beam 516 from the scanning element 508, the control module 512 stops actuating the scanning light source component 502 according to the sensing signal 520.

In this embodiment, the optical scanning projection system 500 may further include a scan driving unit 523. The control module 512 controls the scan driving unit 523 by the reference signal 528, and the scan driving unit 523 may drive the scanning element 508 by the reference signal 528. The control module 512 outputs the synchronization signal to control the scanning light source component 502. The control module 512 may adjust the output time of the synchronization signal according to the time difference between the sensing signal 520, the synchronization signal and the reference signal 528. Here, the details of the control module 512 adjusting the synchronization signal will not be described herein again.

According to the optical scanning projection system of the present disclosure, the transparent element is configured between the first reflecting element and the scanning element, so that the light that originally is not used to form the projection frame (i.e. the reflected light reflected by the transparent element) may be incident on the scanning element. The scanning element may generate the detection frame in the optical scanning projection system by the reflected light. The photosensitive element is configured in the detection frame, so that as soon as the scanning element is faulty and cannot operate, the control module may instantly stop actuating the scanning light source component. Such timely stop can avoid the single bright spot on the image projected by the optical scanning projection system due to the failure of the scanning element and, therefore, avoid viewers' eyes being harmed by such bright spot. On the other hand, in order to avoid the photosensitive element unable to output the corresponding distinguishable sensing signal due to the insufficient light intensity of the detection frame, either the photosensitive element is provided and the light intensity of the detection line does not change with time or the detection light source is provided. Therefore, the photosensitive element is guaranteed to correctly output the corresponding sensing signal. Therefore, the safety of the optical scanning projection system of the present disclosure may be improved. Moreover, with respect to compensation of the blur projection frame caused by the changes of the amplitude of the scanning element, the output time of the synchronization signal is adjusted through the time differences between the synchronization signal, the reference signal and the sensing signal which are received and transferred by the control module.

What is claimed is:

1. An optical scanning projection system, comprising:
    a scanning light source component for emitting a main light beam;
    a transparent element for receiving the main light beam, reflecting a part of the main light beam to be a reflected light, and allowing a part of the main light beam to transmit to become a transmitting light;
    a second reflecting element for reflecting the reflected light;
    a scanning element for reflecting both the transmitting light incident on the scanning element and the reflected light reflected by the second reflecting element in a scanning manner;
    a photosensitive element for receiving the reflected light from the scanning element and outputting a sensing signal; and
    a control module for actuating or stopping actuating the scanning light source component according to the sensing signal.

2. The optical scanning projection system according to claim 1, wherein the optical scanning projection system further comprises a scan driving unit, the control module outputs a synchronization signal to the scanning light source component, the control module outputs a reference signal to the scan driving unit, the scan driving unit drives the scanning element by the reference signal, and the control module adjusts an output time of the synchronization signal according to a time difference between the sensing signal, the synchronization signal and the reference signal.

3. The optical scanning projection system according to claim 1, wherein the transparent element packages the scanning element, and is configured on the scanning element.

4. The optical scanning projection system according to claim 1, wherein the optical scanning projection system further comprises a first reflecting element receiving the main light beam emitted by the scanning light source component and reflecting the main light beam to the transparent element.

5. The optical scanning projection system according to claim 4, wherein the first reflecting element comprises a first reflecting surface, and the first reflecting surface is a metal layer or a coated reflective layer.

6. The optical scanning projection system according to claim 1, wherein the scanning light source component comprises three light sources and three photometers, the light sources respectively emit a red light beam, a green light beam and a blue light beam, a part of the red light beam, a part of the green light beam and a part of the blue light beam are incident on the photometers, the other part of the red light beam, the other part of the green light beam and the other part of the blue light beam are output to the scanning light source component, so that the main light beam comprises the other part of the red light beam, the other part of the green light beam and the other part of the blue light beam.

7. The optical scanning projection system according to claim 6, wherein the control module comprises a video interface, a video decoder, a power supply, a Field-Programmable Gate Array (FPGA), a Central Processing Unit (CPU) and a light source driver, the light source driver comprises three switches for actuating the light sources, when the power supply is turned on, the CPU actuates the control module, the video interface receives a data signal and transfers the data signal to the video decoder, the video decoder decodes the data signal into a decoded signal and then transfers the decoded signal to the FPGA, the FPGA carries out a grayscale process on the decoded signal and transfers the processed signal to the light source driver, the light source driver drives the switches according to the decoded signal according to the grayscale process.

8. The optical scanning projection system according to claim 1, wherein the scanning element comprises a fast shaft for controlling a horizontal direction of a scanning path, a slow shaft for controlling a vertical direction of the scanning path, a mirror being a reflecting surface of the scanning element and an outer ring being an outer frame of the mirror.

9. The optical scanning projection system according to claim 1, wherein when the photosensitive element cannot receive the reflected light from the scanning element, the control module stops actuating the scanning light source component according to the sensing signal.

10. The optical scanning projection system according to claim 1, wherein the second reflecting element comprises a second reflecting surface and the second reflecting surface is a metal layer or a coated reflective layer.

11. An optical scanning projection system, comprising:
    a scanning light source component for emitting a main light beam;
    a transparent element for receiving the main light beam, reflecting a part of the main light beam to be a reflected light, and allowing a part of the main light beam to transmit to become a transmitting light;
    a second reflecting element for reflecting the reflected light;
    a scanning element for reflecting both the transmitting light incident on the scanning element and the reflected light reflected by the second reflecting element in a scanning manner and respectively forming a projection frame and a detection frame, the detection frame comprising a detection line, and a light intensity of the detection line not changing with time;
    a photosensitive element for sensing the detection line and outputting a sensing signal; and
    a control module for actuating or stopping actuating the scanning light source component according to the sensing signal.

12. The optical scanning projection system according to claim 11, wherein the optical scanning projection system further comprises a housing, the housing comprises a light exit aperture and a test area, the test area is configured on one side of the light exit aperture, the transparent element allows a part of the main light beam to transmit to become a transmitting light and be incident on the scanning element, the scanning element reflects the transmitting light in a scanning manner, a part of the transmitting light reflected by the scanning element passes through the light exit aperture to obtain the projection frame, a part of the transmitting light reflected by the scanning element is blocked by the test area and cannot be projected on the projection frame, the test area comprises a test line, and the test line is corresponding to the detection line.

13. The optical scanning projection system according to claim 11, wherein the optical scanning projection system further comprises a first reflecting element receiving the main light beam emitted by the scanning light source component and reflecting the main light beam to the transparent element.

14. The optical scanning projection system according to claim 13, wherein the first reflecting element comprises a first reflecting surface, and the first reflecting surface is a metal layer or a coated reflective layer.

15. The optical scanning projection system according to claim 11, wherein the scanning light source component comprises three light sources and three photometers, the light sources respectively emit a red light beam, a green light beam and a blue light beam, a part of the red light beam, a part of the green light beam and a part of the blue light beam are incident on the photometers, the other part of the red light beam, the other part of the green light beam and the other part of the blue light beam are output to the scanning light source component, so that the main light beam comprises the other part of the red light beam, the other part of the green light beam and the other part of the blue light beam.

16. The optical scanning projection system according to claim 15, wherein the control module comprises a video interface, a video decoder, a power supply, a Field-Programmable Gate Array (FPGA), a Central Processing Unit (CPU) and a light source driver, the light source driver comprises three switches, the switches respectively are actuation switches of the light sources, when the power supply is turned on, the CPU actuates the control module, the video interface receives a data signal and transfers the data signal to the video decoder, the video decoder decodes the data signal into a decoded signal and then transfers the decoded signal to the FPGA, the FPGA carries out a grayscale process on the decoded signal and transfers the processed signal to the light source driver, and the light source driver selectively drives the switches according to the decoded signal subjected to the grayscale process.

17. The optical scanning projection system according to claim 11, wherein the scanning element comprises a fast shaft for controlling a horizontal direction of a scanning path, a slow shaft for controlling a vertical direction of the scanning path, a mirror being a reflecting surface of the scanning element and an outer ring being an outer frame of the mirror.

18. The optical scanning projection system according to claim 11, wherein when the photosensitive element cannot sense the detection line, the control module stops actuating the scanning light source component according to the sensing signal.

19. The optical scanning projection system according to claim 11, wherein the second reflecting element comprises a second reflecting surface and the second reflecting surface is a metal layer or a coated reflective layer.

20. The optical scanning projection system according to claim 11, wherein the optical scanning projection system further comprises a scan driving unit, the control module outputs a synchronization signal to the scanning light source component, the control module outputs a reference signal to the scan driving unit, the scan driving unit drives the scanning element by the reference signal, the control module adjusts an output time of the synchronization signal according to a time difference between the sensing signal, the synchronization signal and the reference signal.

21. An optical scanning projection system, comprising:
a scanning light source component for emitting a main light beam;
a detection light source for emitting a detection light beam;
a laser driving unit for continuously driving the detection light source to emit the detection light beam;
a first reflecting element for receiving and reflecting the main light beam;
a second reflecting element for receiving and reflecting the detection light beam;
a scanning element for reflecting the main light beam from the first reflecting element and the detection light beam from the second reflecting element in a scanning manner;
a photosensitive element for receiving the detection light beam from the scanning element and outputting a sensing signal; and
a control module for actuating or stopping actuating the scanning light source component according to the sensing signal.

22. The optical scanning projection system according to claim 21, wherein the optical scanning projection system further comprises a scan driving unit, the control module outputs a synchronization signal to the scanning light source component, the control module outputs a reference signal to the scan driving unit, the scan driving unit drives the scanning element by the reference signal, and the control module adjusts an output time of the synchronization signal according to a time difference between the sensing signal, the synchronization signal and the reference signal.

23. The optical scanning projection system according to claim 21, wherein the scanning light source component comprises three light sources and three photometers, the light sources respectively emit a red light beam, a green light beam and a blue light beam, a part of the red light beam, a part of the green light beam and a part of the blue light beam are incident on the photometers, the other part of the red light beam, the other part of the green light beam and the other part of the blue light beam are output to the scanning light source component, so that the main light beam comprises the other part of the red light beam, the other part of the green light beam and the other part of the blue light beam.

24. The optical scanning projection system according to claim 23, wherein the control module comprises a video interface, a video decoder, a power supply, a Field-Programmable Gate Array (FPGA), a Central Processing Unit (CPU) and a light source driver, the light source driver comprises three switches, the switches respectively are actuation switches of the light sources, when the power supply is turned on, the CPU actuates the control module, the video interface receives a data signal and transfers the data signal to the video decoder, the video decoder decodes the data signal into a decoded signal and then transfers the decoded signal to the FPGA, the FPGA carries out a grayscale process on the decoded signal and transfers the processed signal to the light source driver, and the light source driver selectively drives the switches according to the decoded signal subjected to the grayscale process.

25. The optical scanning projection system according to claim 21, wherein when the photosensitive element cannot receive the detection light beam from the scanning element, the control module stops actuating the scanning light source component according to the sensing signal.

26. The optical scanning projection system according to claim 21, wherein the first reflecting element comprises a first reflecting surface and the first reflecting surface is a metal layer or a coated reflective layer.

27. The optical scanning projection system according to claim 21, wherein the scanning element comprises a fast shaft, a slow shaft, a mirror and an outer ring, the fast shaft is used to control a horizontal direction of a scanning path, the slow shaft is used to control a vertical direction of the scanning path, the mirror is a reflecting surface of the scanning element, and the outer ring is an outer frame of the mirror.

28. The optical scanning projection system according to claim 21, wherein the second reflecting element comprises a second reflecting surface and the second reflecting surface is a metal layer or a coated reflective layer.

* * * * *